（12）United States Patent
Lim et al.

(10) Patent No.: US 9,319,931 B2
(45) Date of Patent: Apr. 19, 2016

(54) METHOD OF PERFORMING DIRECT COMMUNICATION BETWEEN TERMINALS, METHOD OF SUPPORTING SAME, AND APPARATUS FOR SAME

(75) Inventors: Dongguk Lim, Anyang-si (KR); Hangyu Cho, Anyang-si (KR); Kyujin Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/240,314

(22) PCT Filed: Aug. 27, 2012

(86) PCT No.: PCT/KR2012/006831
§ 371 (c)(1),
(2), (4) Date: Feb. 21, 2014

(87) PCT Pub. No.: WO2013/028044
PCT Pub. Date: Feb. 28, 2013

(65) Prior Publication Data
US 2014/0219095 A1    Aug. 7, 2014

Related U.S. Application Data

(60) Provisional application No. 61/527,126, filed on Aug. 25, 2011.

(51) Int. Cl.
| | |
|---|---|
| *H04B 7/212* | (2006.01) |
| *H04W 28/02* | (2009.01) |
| *H04W 72/08* | (2009.01) |
| *H04W 76/02* | (2009.01) |

(52) U.S. Cl.
CPC ........ *H04W 28/0289* (2013.01); *H04W 72/085* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 2007/0153747 | A1* | 7/2007 | Pan et al. ...................... | 370/338 |
| 2008/0318612 | A1* | 12/2008 | Axnas ................. | H04W 76/023 |
| | | | | 455/522 |
| 2009/0005094 | A1* | 1/2009 | Lee .................... | H04W 52/383 |
| | | | | 455/509 |
| 2009/0011770 | A1 | 1/2009 | Jung et al. | |
| 2009/0015478 | A1* | 1/2009 | Li .......................... | H04B 7/086 |
| | | | | 342/377 |
| 2009/0016250 | A1* | 1/2009 | Li ......................... | H04W 48/08 |
| | | | | 370/310.1 |

(Continued)

FOREIGN PATENT DOCUMENTS

| | | |
|---|---|---|
| KR | 10-2011-0033079 A | 3/2011 |
| WO | WO 2010/049801 A1 | 5/2010 |

*Primary Examiner* — Kwang B Yao
*Assistant Examiner* — Juvena Loo
(74) *Attorney, Agent, or Firm* — Birch, Stewart, Kolasch & Birch, LLP (57) ABSTRACT

A method for performing communication by a device-to-device (D2D) user equipment (UE) performing D2D communication in a wireless communication system supporting the D2D communication, comprises receiving a transmission request signal for D2D communication from at least one other D2D UE; measuring a received signal power or a signal-to-noise ratio (SNR) of the received at least one transmission request signal; generating, based on the measurement, D2D link information including at least one of received signal power or SNR information about a D2D link between the D2D UE and the at least one other D2D UE and information about an interference level caused by the at least one other D2D UE; and transmitting the generated D2D link information and a bandwidth request for D2D communication to a base station.

13 Claims, 5 Drawing Sheets

(56) References Cited

U.S. PATENT DOCUMENTS

| | | | |
|---|---|---|---|
| 2009/0325625 A1* | 12/2009 | Hugl | H04W 52/16 455/522 |
| 2010/0165882 A1* | 7/2010 | Palanki et al. | 370/254 |
| 2010/0261469 A1* | 10/2010 | Ribeiro | H04W 99/00 455/423 |
| 2011/0066738 A1* | 3/2011 | Richardson et al. | 709/229 |
| 2011/0228666 A1* | 9/2011 | Barbieri | H04W 76/023 370/216 |
| 2011/0249643 A1* | 10/2011 | Barbieri et al. | 370/329 |
| 2011/0258313 A1* | 10/2011 | Mallik et al. | 709/224 |
| 2012/0129540 A1* | 5/2012 | Hakola et al. | 455/450 |
| 2012/0184306 A1* | 7/2012 | Zou et al. | 455/458 |
| 2012/0243431 A1* | 9/2012 | Chen et al. | 370/252 |
| 2012/0250636 A1* | 10/2012 | Wang et al. | 370/329 |
| 2013/0078991 A1 | 3/2013 | Nam | |
| 2013/0272196 A1* | 10/2013 | Li | H04W 72/044 370/328 |

\* cited by examiner

METHOD OF PERFORMING DIRECT COMMUNICATION BETWEEN TERMINALS, METHOD OF SUPPORTING SAME, AND APPARATUS FOR SAME

CROSS REFERENCE TO RELATED APPLICATIONS

This application is the National Phase of PCT/KR2012/006831 filed on Aug. 27, 2012, which claims priority under 35 U.S.C. 119(e) to U.S. Provisional Application No. 61/527,126 filed on Aug. 25, 2011, all of which are incorporated by reference herein in their entirety.

TECHNICAL FIELD

The present invention relates to wireless communication and, more particularly, to a method for performing and supporting device-to-device (D2D) communication and an apparatus therefor.

BACKGROUND ART

Recently, with the spread of smartphones and tablet PCs and activation of high-capacity multimedia communication, mobile traffic has significantly increased. Future mobile traffic is expected to increase by about twice current mobile traffic each year. Since most mobile traffic is transmitted through a base station (BS), communication service operators are being confronted with serious network load. To process increasing traffic, communication operators have installed networks and have hurried commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between continuous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to its traffic overload solving ability by distributing traffic converging upon the BS. For this reason, a standardization institute such as 3rd generation partnership (3GPP) or institute of electrical and electronics engineers (IEEE) is establishing D2D communication standard based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

In fact, D2D communication, such as infrared communication, ZigBee, radio frequency identification (RFID), and near field communication (NFC) based on RFID, has already been widely used. However, strictly speaking, it is difficult for these technologies to be classified as D2D communication for decentralizing traffic of a BS because they support only special communication purposes within a significantly limited distance (around 1 m).

While D2D communication has been described hereinabove, a method for performing D2D communication by centralized scheduling has not been proposed in detail up to now.

DETAILED DESCRIPTION OF THE INVENTION

Technical Problems

A technical object to be achieved by the present invention is to provide a method for performing communication by a D2D user equipment (UE) performing D2D communication in a wireless communication system supporting D2D communication.

Another technical object to be achieved by the present invention is to provide a method for supporting D2D communication by a BS in a wireless communication system supporting D2D communication.

A further technical object to be achieved by the present invention is to provide a D2D UE performing D2D communication in a wireless communication system supporting D2D communication.

Still another technical object to be achieved by the present invention is to provide a BS supporting D2D communication in a wireless communication system supporting D2D communication The technical objects that can be achieved through the present invention are not limited to what has been particularly described hereinabove and other technical objects not described herein will be more clearly understood by persons skilled in the art from the following detailed description.

Technical Solutions

To achieve the technical object of the present invention, a method for performing communication by a device-to-device (D2D) user equipment (UE) performing D2D communication in a wireless communication system supporting the D2D communication includes receiving a transmission request signal for D2D communication from at least one other D2D UE; measuring a received signal power or a signal-to-noise ratio (SNR) of the received at least one transmission request signal; generating, based on the measurement, D2D link information including at least one of received signal power or SNR information about a D2D link between the D2D UE and the at least one other D2D UE and information about an interference level caused by the at least one other D2D UE; and transmitting the generated D2D link information and a bandwidth request for D2D communication to a base station. The transmission request signal may include at least one of identifiers of a transmission D2D UE transmitting the transmission request signal and a reception D2D UE receiving the transmission request signal, quality of service (QoS) information, and transmission power level information. The D2D link information may be information about a D2D link between the D2D UE and at least one other D2D UE transmitting the transmission request signal for D2D communication. The D2D link information may include received signal power or SNR information about a D2D link between the D2D UE and another D2D UE having the best channel status. The D2D link information may be transmitted through a data channel and the bandwidth request is transmitted through a control channel.

To achieve another technical object of the present invention, a method for supporting device-to-device (D2D) communication by a base station in a wireless communication system supporting D2D communication includes receiving D2D link information including at least one of received signal power or signal-to-noise ratio (SNR) information about a D2D link between D2D user equipments (UEs) and information about an interference level caused by at least one D2D UE transmitting a transmission request signal for D2D communication, from at least one D2D UE receiving the transmission request signal; and configuring one or more D2D links between D2D UEs based on at least one of the received signal power or signal-to-noise ratio (SNR) information and the information about the interference level, wherein information about the configured D2D links includes information about a D2D UE pair for performing D2D communication. The received D2D link information may further include identifiers of at least one D2D UE transmitting the transmission request signal and at least one D2D UE receiving the transmission request signal and quality of service (QoS) information of the at least one D2D UE transmitting the transmission request signal and wherein the configuring includes configuring a D2D link between the D2D UEs by further considering the QoS information. The method may further include allocating a resource to the configured one or more D2D links in consideration of an interference level between the configured one or more D2D links. The allocating may include allocating the same resource to the configured one or more D2D links having no interference with each other. The allocating may include allocating different resources to the configured one or more D2D links having no interference with each other.

To achieve the other technical object of the present invention, a device-to-device (D2D) user equipment (UE) for performing D2D communication in a wireless communication system supporting D2D communication includes a receiver for receiving a transmission request signal for D2D communication from at least one other D2D UE; a processor for measuring a received signal power or a signal-to-noise ratio (SNR) of the received transmission request signal and generating, based on the measurement, D2D link information including at least one of received signal power or SNR information about a D2D link between the D2D UE and the at least one other D2D UE and information about an interference level caused by the at least one other D2D UE; and a transmitter for transmitting the generated D2D link information and a bandwidth request for D2D communication to a base station.

To achieve the other technical object of the present invention, a base station for supporting device-to-device (D2D) communication in a wireless communication system supporting D2D communication includes a receiver for receiving D2D link information including at least one of received signal power or signal-to-noise ratio (SNR) information about a D2D link between D2D user equipments (UEs) and information about an interference level caused by at least one D2D UE transmitting a transmission request signal for D2D communication, from at least one D2D UE receiving the transmission request signal; and a processor for configuring one or more D2D links between D2D UEs based on at least one of the received signal power or signal-to-noise ratio (SNR) information and the information about the interference level, wherein information about the configured D2D links includes information about a D2D UE pair for performing D2D communication. The received D2D link information may further include identifiers of at least one D2D UE transmitting the transmission request signal and at least one D2D UE receiving the transmission request signal and quality of service (QoS) information of the at least one D2D UE transmitting the transmission request signal and wherein the processor configures a D2D link between the D2D UEs by further considering the QoS information. The processor may allocate a resource to the configured one or more D2D links in consideration of an interference level between the configured one or more D2D links.

Advantageous Effects

According to various embodiments of the present invention, D2D UEs can efficiently perform D2D communication using an optimal D2D link and an optimal allocation resource.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide thorough understanding of the present invention. However, it will be apparent to those skilled in the art that the present invention may be practiced without such specific details. For example, although the following detailed description is given under the assumption of a 3GPP LTE system as a mobile communication system, it is applicable to other mobile communication systems except for matters that are specific to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a user equipment (UE) refers to a mobile or fixed user equipment such as a mobile station (MS) or an advanced mobile station (AMS)

and a base station (BS) refers to an arbitrary node of a network stage communicating with a UE, such as a Node B, an eNode B, or an access point (AP). Although this specification is described based on an IEEE 802.16 system, the disclosure of the present invention is applicable to various communication systems.

In a mobile communication system, a UE may receive information on downlink from an eNB, and the UE may transmit information on uplink. Information transmitted and received by the UE includes data and various control information. A variety of physical channels are present according to types or usages of information transmitted or received by the UE.

The following technique can be applied to a variety of radio access systems, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is part of evolved UMTS (E-UMTS) using E-UTRA. 3GPP LTE employs OFDMA in DL and employs SC-FDMA in UL. LTE-advanced (LTE-A) is an evolved version of 3GPP LTE.

Specific terms used in the following description are proposed to aid in understanding the present invention, and the use of these specific terms may be changed to another format within the technical scope or spirit of the present invention.

Figure 1:
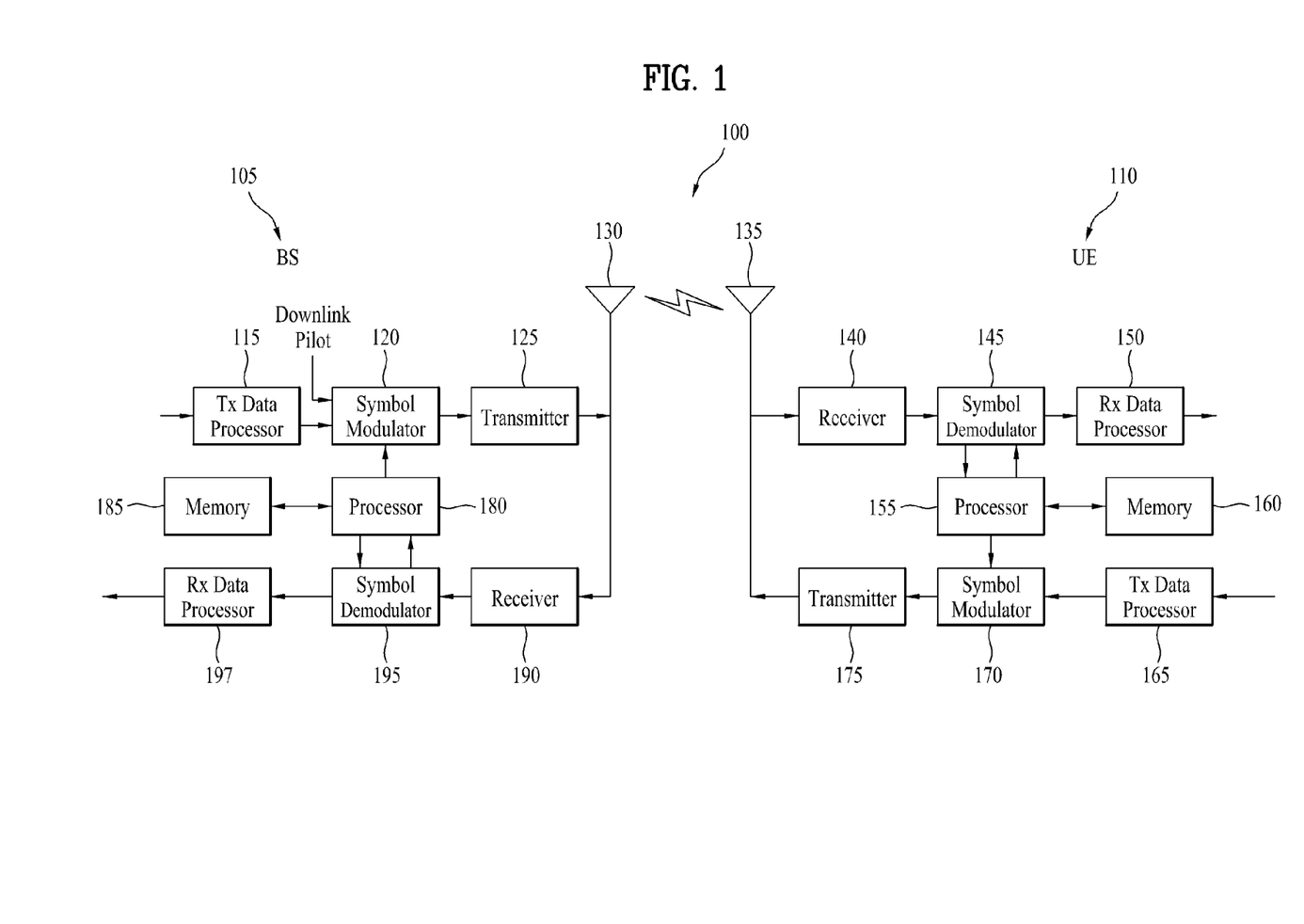
FIG. 1 is a block diagram illustrating the configuration of a BS 105 and a UE 110 in a wireless communication system 100.

FIG. 1 is a block diagram illustrating the configuration of a BS 105 and a UE 110 in a wireless communication system 100.

One BS 105 and one UE 110 (including a D2D UE) are illustrated to simplify the wireless communication system 100. However, the wireless communication system 100 may include more than one BS and/or more than one UE.

Referring to FIG. 1, the BS 105 may include a transmission (Tx) data processor 115, a symbol modulator 120, a transmitter 125, a transmission/reception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. Although one antenna 130 and one antenna 135 are depicted in the BS 105 and the UE 110, respectively, each of the BS 105 and the UE 110 includes a plurality of antennas. Accordingly, the BS 105 and the UE 110 according to the present invention support a multiple input multiple output (MIMO) system. The BS 105 according to the present invention may support both a single user-MIMO (SU-MIMO) scheme and a multi user-MIMO (MU-MIMO) scheme.

On downlink, the Tx data processor 115 receives, formats, codes, interleaves, and modulates (or symbol maps) traffic data and provides modulated symbols ("data symbols"). The symbol modulator 120 receives and processes the data symbols and pilot symbols and provides a stream of symbols.

The symbol modulator 120 multiplexes the data and pilot symbols and transmits the multiplexed symbols to the transmitter 125. Each transmission symbol may be a data symbol, a pilot symbol, or a signal value of zero. Pilot symbols may be sent successively in each symbol period. The pilot symbols may be frequency division multiplexed (FDM), orthogonal frequency division multiplexed (OFDM), time division multiplexed (TDM), or code division multiplexed (CDM) symbols.

The transmitter 125 receives and converts the stream of symbols into one or more analog signals and further coordinates (e.g., amplifies, filters, and frequency up-converts) the analog signals to generate downlink signals suitable for transmission over a radio channel. The downlink signals are then transmitted through the antenna 130 to the UE.

In the configuration of the UE 110, the antenna 135 receives the downlink signals from the BS 105 and provides the received signals to the receiver 140. The receiver 140 coordinates (e.g., filters, amplifies, and frequency down-converts) the received signals and digitizes the coordinated signals to obtain samples. The symbol demodulator 145 demodulates received pilot symbols and provides the demodulated pilot symbols to the processor 155 for channel estimation.

The symbol demodulator 145 receives a frequency response estimate for downlink from the processor 155, performs data demodulation upon received data symbols to obtain data symbol estimates (which are estimates of transmitted data symbols), and provides the data symbol estimates to the Rx data processor 150. The Rx data processor 150 demodulates (e.g., symbol demaps), deinterleaves, and decodes the data symbol estimates to recover the transmitted traffic data.

Processing by the symbol demodulator 145 and the Rx data processor 150 is complementary to processing by the symbol modulator 120 and the Tx data processor 115, respectively, in the BS 105.

On uplink, the Tx data processor 165 of the UE 110 processes traffic data and provides data symbols. The symbol modulator 170 receives and multiplexes the data symbols, performs modulation, and provides a stream of symbols to the transmitter 175. The transmitter 175 then receives and processes the stream of symbols to generate uplink signals, which are transmitted through the antenna 135 to the BS 105.

In the BS 105, the uplink signals from the UE 110 are received through the antenna 130 and the receiver 190 processes the received uplink signals to obtain samples. The symbol demodulator 195 then processes the samples and provides received pilot symbols and data symbol estimates for uplink. The Rx data processor 197 processes the data symbol estimates to recover traffic data transmitted from the UE 110.

The processors 155 and 180 of the UE 110 and the BS 105 direct (e.g., control, coordinate, manage, etc.) operation at the UE 110 and the BS 105, respectively. The respective processors 155 and 180 may be connected to the memories 160 and 185 that store program code and data. The memories 160 and 185 are connected to the processor 180 to store operating systems, applications, and general files.

The processors 155 and 180 may be referred to as controllers, microcontrollers, microprocessors, microcomputers, etc. Meanwhile, the processors 155 and 180 may be implemented by hardware, firmware, software, or combinations thereof. When embodiments of the present invention are achieved using hardware, application specific integrated circuits (ASICs), digital signal processors (DSPs), digital signal processing devices (DSPDs), programmable logic devices (PLDs), or field programmable gate arrays (FPGAs), which are configured to perform the present invention, may be included in the processors 155 and 180.

On the other hand, when embodiments of the present invention are implemented using firmware or software, firmware or software may be configured to include a module, a procedure, a function, etc. performing functions or operations of the present invention. The firmware or software configured to perform the present invention may be included in the processors 155 and 180 or stored in the memories 160 and 185 so as to be executed by the processors 155 and 180.

Layers of a radio interface protocol between a UE/BS and a radio communication system (network) may be divided into a first layer (L1), a second layer (L2), and a third layer (L3), based on the three lowest layers of the open systems interconnection (OSI) model widely known in the art of communication systems. A physical layer belongs to the first layer and provides information transfer services through a physical channel. A radio resource control (RRC) layer belongs to the third layer and provides control radio resources between the UE and the network. The UE/BS may exchange RRC messages with the radio communication network through the RRC layer.

Hereinafter, a method is proposed for performing transmission by receiving a resource (or band) allocated to transmit data to another UE through centralized scheduling in the case in which a UE performs device-to-device communication (hereinafter, referred to as D2D communication or D2D direct communication). Although such a proposed method will be described based on 3GPP LTE/LTE-A by way of example for detailed explanation, the method may be applied to other communication systems (IEEE 802.16, WiMAX, etc.).

Figure 2:
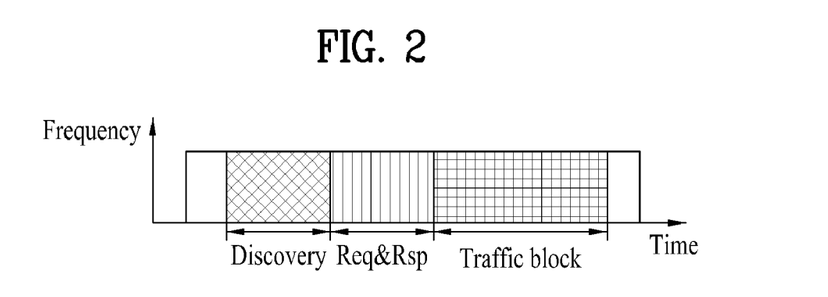
FIG. 2 is a diagram illustrating a frame structure for D2D communication.

In the present invention, a UE performs D2D communication using a frame structure as illustrated in FIG. 2.

FIG. 2 is a diagram illustrating a frame structure for D2D communication.

The UE performs D2D communication using the frame structure as in FIG. 2 and a frame illustrated in FIG. 2 may include a discovery interval, a request and response (Req & Rsp) interval, and a traffic block interval. A UE that can perform D2D communication or performs D2D communication (hereinafter, referred to as a D2D UE) may judge whether neighbor D2D UEs are present through the discovery interval.

To perform D2D communication through the Req & Rsp interval, the D2D UE may perform an operation such as transmission/reception of a transmission (Tx) request signal, transmission of a D2D request to a BS, and reception of resource allocation (RA) information, through the Req & Rsp interval. The names of the intervals illustrated in FIG. 2 are purely exemplary and other names may be used. In addition, operation regions for the D2D UE may be defined by distinguishing according to frequency rather than time, unlike FIG. 2.

The UE may receive information about the frame structure for D2D communication (e.g. interval length (discovery interval length and Req & Rsp interval length), a period, and information about the number of symbols/subframes/slots, and start point information (information about an index of a slot/symbol/subframe)) from the BS through a broadcast channel (e.g. a physical broadcast channel (PBCH)) or a control channel (e.g. a physical downlink control channel (PDCCH)).

Prior to performing D2D communication, the UE performs D2D discovery in order to detect neighbor devices and broadly performs two operations for discovery. As the first operation, the UE receives discovery signals transmitted by neighbor UEs through a broadcast signal and obtains identifier information about the UEs, transmitted through the received signals, so that the UE is able to know whether other UEs are present in the vicinity thereof. As the second operation, the UE broadcasts identifier information thereof through a discovery signal to inform neighbor UEs of the presence thereof. In this case, the broadcast discovery signal may be transmitted using a resource (i.e. an empty resource) in a broadcast channel, unused by other UEs to transmit discovery signals. Hereinafter, a method for detecting neighbor UEs for D2D communication will be described in detail with reference to the drawings.

In this disclosure, a transmission (Tx) D2D UE refers to a UE that has transmitted a transmit request signal (TRS) and a reception (Rx) D2D UE refers to a UE that has received a TRS. A D2D UE may transmit TRSs to other D2D UEs and receive TRSs from other D2D UEs. In D2D UEs, a D2D UE that has transmitted a TRS is a Tx D2D UE and a D2D UE that has received the TRS is an Rx D2D UE. Other names may be used as the TRS.

Figure 3:
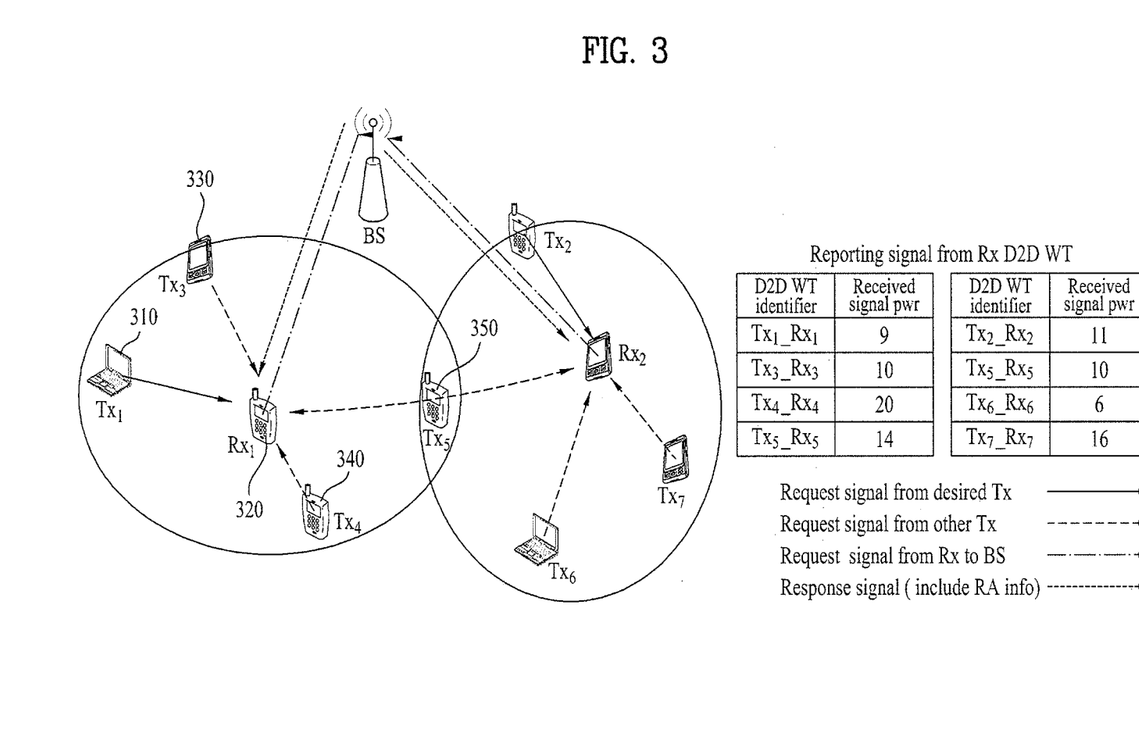
FIG. 3 is a diagram conceptually explaining a method for discovering neighbor UEs for D2D communication.

FIG. 3 is a diagram conceptually explaining a method for discovering neighbor UEs for D2D communication.

A Tx D2D UE 1 310 may judge whether other UEs are present in the vicinity thereof through discovery and transmit a TRS to an Rx D2D UE 2 320, that is, a neighbor D2D UE, to perform D2D communication. The TRS may include information such as an identifier of the Tx D2D UE 1 310, an identifier of the Rx D2D UE 2 320 receiving the TRS, quality of service (QoS) of the Tx D2D UE 1 310, a Tx power level of the Tx D2D UE 1 310, etc. and may be transmitted through the broadcast channel.

The Rx D2D UE may receive TRSs transmitted by neighbor Tx D2D UEs 310, 330, 340, and 350. That is, the D2D UE may discern information about D2D UEs that are operating or desire to operate in the vicinity thereof by receiving TRSs transmitted by active D2D UEs in the vicinity thereof and measure an interference level by another D2D link or with respect to another D2D link by measuring received signal powers, signal-to-noise ratios (SNRs), etc. of the TRSs.

Thus, the Rx D2D UE 2 320 monitoring the TRSs transmitted by the Tx D2D UE 1 310 etc. to perform D2D communication may measure information about interference levels (received signal power levels or SNRs) of neighbor D2D links based on the TRSs received from the neighbor D2D UEs as well as the TRS received from the Tx D2D UE 1 310 and compose a neighbor D2D link list or table using the measured information about interference levels of the received signal power levels or SNRs (i.e. a list or table based on received signal power or SNR values between the Rx D2D UE 2 320 and the Tx D2D UEs transmitting the TRSs). That is, the list or table may include information about the interference levels of the neighbor D2D UEs. As an example, when the Rx D2D UE 2 320 receives the TRSs transmitted by the neighbor D2D UEs, if a destination (i.e. a receiver) of the received TRSs is not the Rx D2D UE 2 320, it may be predicted that the TRSs function as interference with respect the Rx D2D UE 2 320. In FIG. 3, lists composed by other Rx D2D UEs, as well as the Rx D2D UE 1 320, based on TRSs are illustrated.

The list or table composed by the Rx D2D UE 2 320 may be transmitted to a BS through an uplink control channel (e.g. a physical uplink control channel (PUCCH)) or an uplink data channel (e.g. a physical uplink shared channel (PUSCH)) together with D2D link information including a D2D bandwidth request or a D2D indicator and a D2D identifier. In this case, the list or table composed by the D2D UE 2 320, the bandwidth request or D2D indicator, and the D2D identifier are referred to as D2D link information.

In addition, when there is a large amount of list or table information transmitted by the D2D UE 2 320 so that it is difficult to transmit the information through the PUCCH, the D2D UE 2 320 may transmit, on the PUCCH, information about the PUSCH on which information including the D2D bandwidth request or D2D indicator and the list is transmitted and transmit, on the PUSCH, the list information obtained by measurement.

The Rx D2D UE (e.g. the D2D UE 2 320) may transmit information (e.g. including the composed neighbor D2D link list or table) about the Tx D2D UE (e.g. the D2D UE 1 310) and the D2D bandwidth request or D2D indicator to the BS through a D2D request signal. Here, the list transmitted by the Rx D2D UE 2 230 to the BS may include information about QoS between D2D links included in the TRS transmitted by the Tx D2D UE. Thus, the Rx D2D UE 2 320 may transmit, to the BS, information obtained by measuring a TRS whenever the TRS is transmitted by triggering the information about neighbor D2D UEs, obtained by receiving TRSs from the Tx D2D UEs 310, 330, 340, and 350, on a predetermined period or event basis. In this case, the Rx D2D UE transmits the measured information to the BS only when there is a Tx D2D UE transmitting a D2D request that desires to perform D2D communication in information detected through the received TRSs by the Rx D2D UE (a D2D request therefor and/or requests for other Rx D2D UEs). In addition, the Rx D2D UE feeds back the measured information to the BS only when there is a request therefor so that overhead of transmitting information about UEs that do not perform D2D communication may be reduced.

While FIG. 3 exemplarily shows that only the D2D UE 2 320 receives the TRSs, the other D2D UEs 310, 330, 340, and 350 may also receive the TRSs from D2D UEs for D2D communication.

In this way, upon receiving TRS information received from the Tx UEs and D2D request information, the BS may perform 1) D2D link establishment and 2) resource allocation for a D2D link, using received measurement information. Hereinafter, an operation of D2D link establishment and resource allocation for the D2D link will be described.

D2D Link Establishment

As described above, a Tx D2D UE transmits a TRS to a desired Rx D2D UE in order to perform D2D communication and, in this case, the Rx D2D UE composes a list by performing measurement for TRSs received from Tx D2D UEs. The Rx D2D UE transmits the composed list to the BS and then the BS may discern, through the received list, the Rx D2D UE with which the Tx D2D UE desires to perform D2D communication, that is, information about a destination or information about a D2D link during D2D communication implementation.

Accordingly, the BS may obtain information (identifiers, QoS levels, and Tx power levels) about Tx D2D UEs that desire to perform D2D communication with the Rx D2D UE and information about received signal power between each Tx D2D UE and the Rx D2D UE, through the list information. The BS may configure (or determine) the Tx D2D UE for performing D2D communication with the Rx D2D UE using the received signal power and QoS based on the obtained information.

For example, when Tx D2D UEs that desire to perform D2D communication with an Rx D2D UE 1 (Rx 1) are a Tx D2D UE 1 (Tx 1) and a Tx D2D UE 3 (Tx 3), if a received signal power level and a QoS level, received from the Tx D2D UE 1 (Tx 1), are 5 and 7 and a QoS level and a received signal power level, received from the Tx D2D UE 3 (Tx 3), are 3 and 4, the BS compares the QoS levels and the received signal power levels transmitted by the Tx D2D UEs. At this time, although the signal power between two UEs is high in the Tx D2D UE 1 (Tx 1) and the Rx D2D UE 1 (Rx 1), it is difficult for the link to satisfy a demanded QoS level (i.e. 7). Therefore, connection between the Tx D2D UE (Tx 3) and the Rx D2D UE 1 (Rx 1) capable of satisfying the QoS level may be selected as a D2D link. Thus, the BS selects a Tx D2D UE which is to transmit data through D2D communication to the Rx D2D UE and indicates the selected Tx D2D UE to the configured D2D pair (a specific Tx D2D UE and a specific Tx D2D UE).

In addition, as opposed to the above example, the BS may list links included in the list per QoS level or SNR (or received signal power) and then establish the links in a high order.

Resource Allocation for D2D Communication

The BS, which has configured a Tx D2D UE for performing D2D communication with respect to Rx D2D UEs through D2D link establishment, may allocate resources to a D2D link established using signal power received from other D2D Tx UEs included in the list information transmitted by the Rx D2D UE. In this case, since a D2D link including a Tx D2D UE having a high received signal power measured by an Rx D2D UE of the established D2D link has significant interference having an effect on the established D2D link, the BS may allocate different resources (or bands) to the two D2D links to reduce the influence of interference between the links. In addition, the same resource (or band) is allocated to a D2D link of a Tx D2D UE which has a weak received signal power or which is not included in the list transmitted by the Rx D2D UE. That is, frequency efficiency can be raised by allocating the same resource to multiple D2D links which do not interfere with each other. Moreover, the BS may allocate multiple resources or bands by setting priority per resource without allocating only one resource to the established D2D link FIG. 4 is a diagram explaining D2D link establishment and resource allocation for a D2D link.

Figure 4:
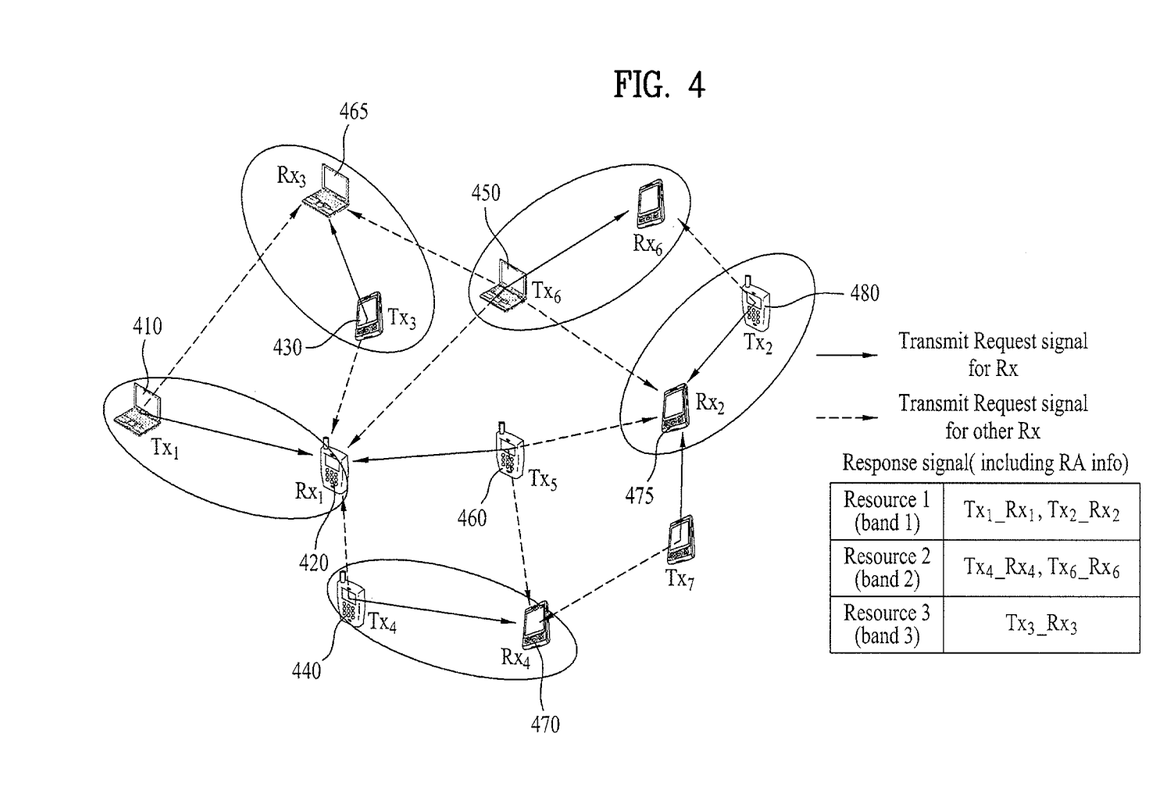
FIG. 4 is a diagram explaining D2D link establishment and resource allocation for a D2D link.

FIG. 4 illustrates resource allocation and a D2D link established through a discovery process of neighbor UEs for D2D communication described in FIG. 3. As illustrated in FIG. 4, as an example, an Rx D2D UE 1 420 (Rx 1) receives TRSs from a Tx D2D UE 1 410 (Tx 1) and a Tx D2D UE 5 460 (Tx 5) that desire to perform D2D communication therewith. The Rx D2D UE 1 420 (Rx 1) also receives TRSs transmitted by a Tx D2D UE 3 430 (Tx 3), a Tx D2D UE 4 440 (Tx 4), and a Tx D2D UE 6 450 (Tx 6) in the vicinity thereof to other respective Rx D2D UEs to compose a list including identifiers, QoS levels, received signal power levels, etc. In addition, the Rx D2D UEs 2, 3, 4 (475, 465, and 470) (Rx 2, Rx 3, and Rx 4) also compose lists by receiving TRSs transmitted thereto and TRSs transmitted to other Rx D2D UEs.

The Rx D2D UEs 420, 475, 465, and 470 transmit the composed lists (including identifiers of Tx D2D UEs and Rx D2D UEs, QoS levels, received signal powers, or SNRs) to each BS and the BS performs a pairing operation of a D2D link, that is, a Tx D2D UE and an Rx D2D UE, based on the list information. In this case, in order to allocate resources (bands) for performing D2D communication with respect to D2D links (Tx 1 and Rx 1, Tx 2 and Rx 2, Tx 3 and Rx 3, Tx 4 and Rx 4, and Tx 6 and Rx 6) established as shown in FIG. 4, the BS allocates the same resource to links having no interference in consideration of an interference level or received signal power received from other D2D links in the lists received from the Rx D2D UEs 420, 475, 465, and 470.

For example, as illustrated in FIG. 4, it can be appreciated through the lists transmitted by the Rx D2D UEs that interference for a D2D link 1 (Tx 1 and Rx 1) established by the BS is transmitted from the Tx D2D UEs 3, 4, and 6 (430, 440, and 460). Since the Tx D2D UEs 3, 4, and 6 (430, 440, and 460) have established the D2D links, the BS may allocate difference resources to the D2D links including Tx D2D UEs 3, 4, and 6 (430, 440, and 460) (Tx 3, Tx 4, and Tx 6) and the D2D link 1 (Tx 1 and Rx 1), thereby reducing the influence of interference. Meanwhile, since there is no interference with the D2D link of the Tx D2D UE 480 (Tx 2) not measured by the Rx D2D UE, the BS may allocate the same resource to the D2D link 1 (Tx 1 and Rx 1) and the D2D links including Tx D2D UEs 3, 4, and 6 (430, 440, and 460) (Tx 3, Tx 4, and Tx 6). In this case, if an interference degree or level does not exceed a threshold for D2D transmission even though a D2D link creates interference, the same resource may be allocated.

After configuring a Tx D2D UE for an Rx D2D UE and allocating resources to an established D2D link, the BS may transmit information about D2D link establishment and resource allocation to the UEs through a control channel (e.g. a PDCCH). In this case, the information or signals transmitted by the BS to the D2D link UEs through the PDCCH may include measurement information (including a pilot sequence, Tx power, a cyclic shift value, configuration information, etc.) for measuring a channel status between the two UEs through the allocated channel or resource, a measurement indicator, and a threshold for D2D transmission.

Meanwhile, the BS may simultaneously transmit the resource allocation information by paring/grouping multiple D2D links to which the same resource is allocated. Thus, a Tx D2D UE and an Rx D2D UE may perform D2D communication using the resource (a channel or band) allocated by the BS in consideration of channel status. That is, the Tx D2D UE may transmit a reference signal (or pilot signal) to the Rx D2D UE through the allocated resource (channel or band) and the Rx D2D UE may discern the channel status by receiving and measuring the reference signal. In other words, the Rx D2D UE may discern the channel status (channel quality information (CQI), channel state information (CSI), signal-to-interference-plus-noise ratio (SINR), etc.) through the pilot or reference signal transmitted by the Tx D2D UE and feeds back a measurement result for the channel status to the Tx D2D UE that transmitted the reference signal. Upon receiving the measurement result for the channel state from the Rx D2D UE, the Tx D2D UE may compare the measurement result with a threshold received from the BS and determine whether to perform D2D transmission in a corresponding resource or channel. For example, if a measured CQI or SINR is less or lower than the threshold, the Tx D2D UE does not perform D2D communication on the channel and transmits a bandwidth request (BR) to the BS to re-receive a resource allocated for D2D transmission or re-perform measurement using a resource or channel corresponding to the next priority among multiple channels transmitted by the BS. On the contrary, if the measured CQI or SINR value is higher than the threshold, the Tx D2D UE performs D2D transmission using a corresponding channel.

Figure 5:
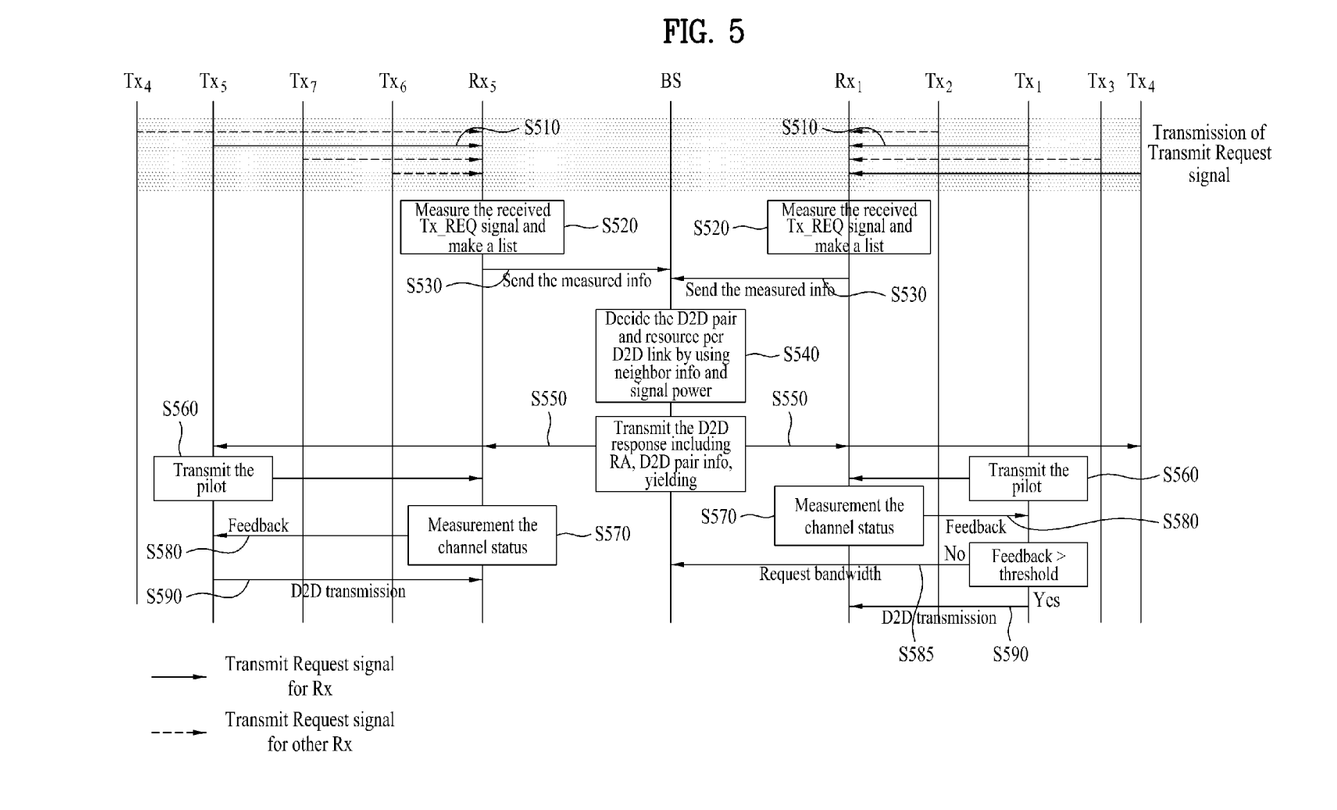
FIG. 5 is a diagram explaining a process for transmitting data through D2D communication at a D2D UE.

FIG. 5 is a diagram explaining a process for transmitting data through D2D communication at a D2D UE.

Referring to FIG. 5, an Rx D2D UE 5 (Rx 5) may receive TRSs from Tx D2D UEs (Tx 4, Tx 5, Tx 6, and Tx 7) and an Rx D2D UE 1 (Rx 1) may receive TRSs from Tx D2D UEs (Tx 1, Tx 2, Tx 3, and Tx 4) (S510).

In this case, the Rx D2D UEs 1 and 5 (Rx 1 and Rx 5) discern a signal power/interference level of each band or resource through measurement for the band or resource without directly transmitting information obtained through the TRSs to a BS (S520). In this case, although the Rx D2D UEs 1 and 5 (Rx 1 and Rx 5) may transmit information about all bands or resources obtained through measurement, the Rx D2D UEs 1 and 5 may transmit information about the best band/resource or the worst band/resource to the BS together with list information about neighbor UEs, in consideration of signaling overhead (S520). The best band/resource denotes a band/resource having the least measured signal power/interference level and corresponds to a band/resource on which D2D transmission is desired. On the contrary, the worst band/resource indicates a band/resource having the greatest measured signal power/interference level and corresponds to a band/resource to be avoided due to the influence of much interference while D2D transmission is performed. Information about the best or worst band (or resource) transmitted by the Rx D2D UEs 1 and 5 (Rx 1 and Rx 5) to the BS may be information about one band or resource or a set of multiple bands or resources. When the set is transmitted, the bands or resources are sequentially transmitted through ordering.

The Rx D2D UEs 1 and 5 (Rx 1 and Rx 5) may transmit the discerned information about each band or resource to the BS together with the information about the neighbor D2D UEs (S530). Upon receiving the list including information about neighbor D2D UEs and interference, transmitted by the Rx D2D UEs 1 and 5 (Rx 1 and Rx 5) and receiving the information about the best or worst band/resource, the BS may determine a D2D pair and determine a resource to be allocated per D2D link, through the information (S540). In this case, the BS may allocate the best band/resource per D2D link or allocate a band/resource except for the worst band/resource.

If the best band/resource transmitted by the Rx D2D UE 1 (Rx 1) overlaps with that transmitted by, for example, the Rx D2D UE 5 (Rx 5), the BS may compare QoS levels and signal powers/interference levels of links and allocate the best resource/band to a D2D link having better performance (i.e. a link having a low interference level or a high QoS level).

In this way, the BS can allocate an optimal resource/band to each D2D link using information about neighbor D2D UEs, the channel status of a resource/band obtained through measurement, and interference information, transmitted by the D2D UE.

In addition, if the two D2D links have less interference or no interference therebetween, the BS may allocate the same resource to the two D2D links.

After allocating the resource/band for the D2D link, the BS may transmit a response message including resource allocation (RA) information, D2D pair information, and yielding information to the Tx D2D UEs and the Rx D2D UEs (S550). Here, the yielding information refers to information indicating that a specific D2D UE cannot currently communicate with another specific D2D UE.

Next, in order to discern a channel status for the resource/band allocated from the BS, the Tx D2D UEs (e.g. the Tx D2D UEs 1 and 5 (Tx 1 and Tx 5) may transmit reference signals to the Rx D2D UEs 1 and 5 (Rx 1 and Rx 5), respectively (S560). Then, the Rx D2D UEs 1 and 5 (Rx 1 and Rx 5) may measure channel statuses based on the received reference signals (S570) and feed back the measured channel statuses to the Tx D2D UEs 1 and 5 (Tx 1 and Tx 5) (S580).

The Tx D2D UE 1 (Tx 1) compares the feedback channel status with a threshold for D2D transmission and, if the channel status is better than the threshold, D2D communication is performed between the Rx D2D UE and the Tx D2D UE (S590). On the contrary, as a result that the Tx D2D UE 5 (Tx 5) compares the feedback channel status with the threshold for D2D transmission, if the channel status is not better than the threshold, the Tx D2D UE 5 (Tx 5) transmits a bandwidth request to the BS (S585) and performs D2D communication through a reallocated resource (S590).

According to the above-described embodiments of the present invention, D2D UEs can efficiently perform D2D communication using an optimal D2D link and an optimal allocated resource.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

The method for performing D2D communication and the apparatus therefor are applicable to various communication systems such as 3GPP LTE, LTE-A, and IEEE 802 systems.

The invention claimed is:

1. A method for performing communication by a device-to-device (D2D) user equipment (UE) performing D2D communication in a wireless communication system supporting the D2D communication, the method comprising:
receiving transmission request signals from other D2D UEs;
detecting a transmission request signal for the D2D UE from at least one first D2D UE among the other D2D UEs;
when the transmission request signal from the at least one first D2D UE is detected, measuring a received signal power or a signal-to-noise ratio (SNR) of the received transmission request signals;
generating, based on the measurement, D2D link information including at least one of received signal power or SNR information about a D2D link between the D2D UE and the at least one first D2D UE and interference information about an interference level caused by the at least one second D2D UE among the other D2D UEs, wherein the interference information includes at least one identifier of the at least one second D2D UE;
transmitting a bandwidth request for D2D communication and information about a Physical Uplink Shared Channel (PUSCH) including the generated D2D link information to a base station through a Physical Uplink Control Channel (PUCCH); and
transmitting the generated D2D link information to the base station through the PUSCH.

2. The method according to claim 1, wherein each of the transmission request signals includes at least one of identifiers of a transmission D2D UE transmitting the transmission request signal and a reception D2D UE receiving the transmission request signal, quality of service (QoS) information, and transmission power level information.

3. The method according to claim 1, wherein the D2D link information is information about a D2D link between the D2D UE and at least one first D2D UE transmitting the transmission request signal for D2D communication.

4. The method according to claim 1, wherein the D2D link information includes received signal power or SNR information about a D2D link between the D2D UE and another D2D UE having the best channel status.

5. A method for supporting device-to-device (D2D) communication by a base station in a wireless communication system supporting D2D communication, the method comprising:
receiving a bandwidth request for D2D communication and information about a Physical Uplink Shared Channel (PUSCH) including D2D link information from a D2D user equipment (UE) through a Physical Uplink Control Channel (PUCCH);
receiving, according to the received information about the PUSCH, the D2D link information including at least one of received signal power or signal-to-noise ratio (SNR) information about a D2D link between the D2D UE and at least one first D2D UE transmitting a transmission request signal for the D2D UE and interference information about an interference level caused by at least one second D2D UE transmitting a transmission request signal for other D2D UEs other than the D2D UE, from the D2D UE receiving the transmission request signal from the at least one first D2D UE, wherein the interference information includes at least one identifier of the at least one second D2D UE; and
configuring one or more D2D links between the D2D UE and the at least one first D2D UE based on at least one of the received signal power or signal-to-noise ratio (SNR) information and the interference information,
wherein information about the configured D2D links includes information about a D2D UE pair for performing D2D communication.

6. The method according to claim 5, wherein the received D2D link information further includes identifiers of at least one D2D UE transmitting the transmission request signal and at least one D2D UE receiving the transmission request signal and quality of service (QoS) information of the at least one D2D UE transmitting the transmission request signal and wherein the configuring includes configuring a D2D link between the D2D UEs by further considering the QoS information.

7. The method according to claim 5, further comprising allocating a resource to the configured one or more D2D links in consideration of an interference level between the configured one or more D2D links.

8. The method according to claim 7, wherein the allocating includes allocating the same resource to the configured one or more D2D links having no interference with each other.

9. The method according to claim 7, wherein the allocating includes allocating different resources to the configured one or more D2D links having no interference with each other.

10. A device-to-device (D2D) user equipment (UE) for performing D2D communication in a wireless communication system supporting D2D communication, the D2D UE comprising:
a receiver configured to receive signals;
a transmitter configured to transmit signals; and a processor configured to control the receiver and the transmitter, wherein the processor is further configured to:
receive transmission request signals from other D2D UEs,
detect a transmission request signal for the D2D UE from at least one first D2D UE among the other D2D UEs,
when the transmission request signal from the at least one first D2D UE is detected, measure a received signal power or a signal-to-noise ratio (SNR) of the received transmission request signals,
generate, based on the measurement, D2D link information including at least one of received signal power or SNR information about a D2D link between the D2D UE and the at least one first D2D UE and interference information about an interference level caused by the at least one second D2D UE; among the other D2D UEs, wherein the interference information includes at least one identifier of the at least one second D2D UE,
transmit a bandwidth request for D2D communication and information about a Physical Uplink Shared Channel (PUSCH) including the generated D2D link information to a base station through a Physical Uplink Control Channel (PUCCH), and
transmit the generated D2D link information to the base station through the PUSCH.

11. A base station for supporting device-to-device (D2D) communication in a wireless communication system supporting D2D communication, the base station comprising:
a receiver configured to receive signals; and
a processor configured to control the receiver, wherein the processor is further configured to:
receive a bandwidth request for D2D communication and information about a Physical Uplink Shared Channel (PUSCH) including D2D link information from a D2D user equipment (UE) through a Physical Uplink Control Channel (PUCCH),
receive, according to the received information about the PUSCH, the D2D link information including at least one of received signal power or signal-to-noise ratio (SNR) information about a D2D link between the D2D UE and at least one first D2D UE transmitting a transmission request signal for the D2D UE and interference information about an interference level caused by at least one second D2D UE transmitting a transmission request signal for other D2D UEs other than the D2D UE, from the D2D UE receiving the transmission request signal from the at least one first D2D UE, wherein the interference information includes at least one identifier of the at least one second D2D UE, and
configure one or more D2D links between the D2D UE and the at least one first D2D UE based on at least one of the received signal power or signal-to-noise ratio (SNR) information and the interference information, and
wherein information about the configured D2D links includes information about a D2D UE pair for performing D2D communication.

12. The base station according to claim 11, wherein the received D2D link information further includes identifiers of at least one D2D UE transmitting the transmission request signal and at least one D2D UE receiving the transmission request signal and quality of service (QoS) information of the at least one D2D UE transmitting the transmission request signal and wherein the processor configures a D2D link between the D2D UEs by further considering the QoS information.

13. The base station of according to claim 11, wherein the processor allocates a resource to the configured one or more D2D links in consideration of an interference level between the configured one or more D2D links.

* * * * *